Jan. 15, 1929. 1,699,509
P. R. BASSETT
CONTROL OF ARC LIGHTS
Filed May 24, 1922 2 Sheets-Sheet 1
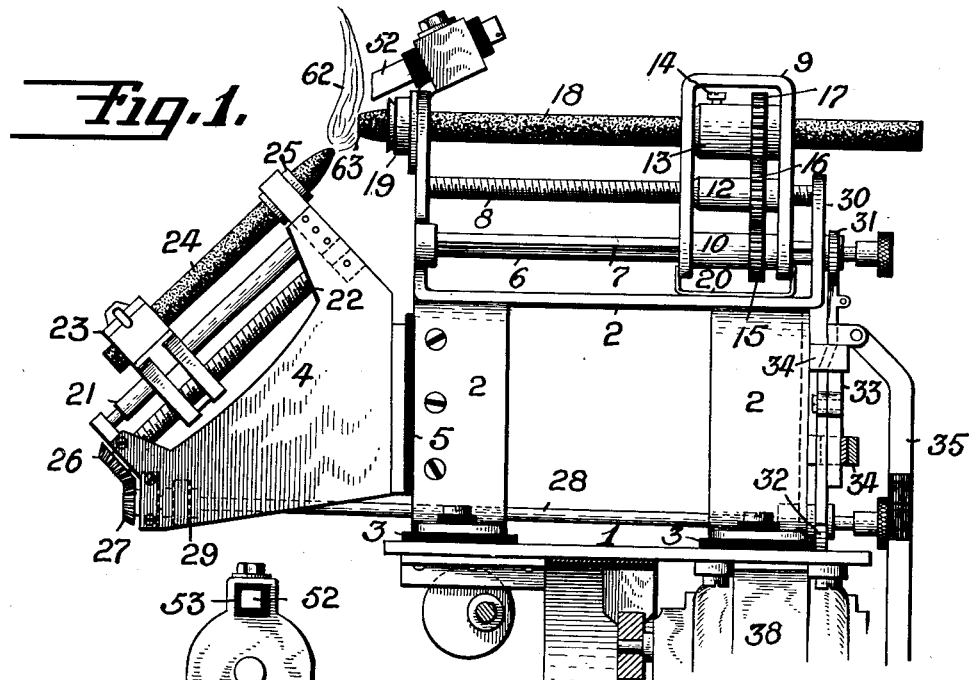
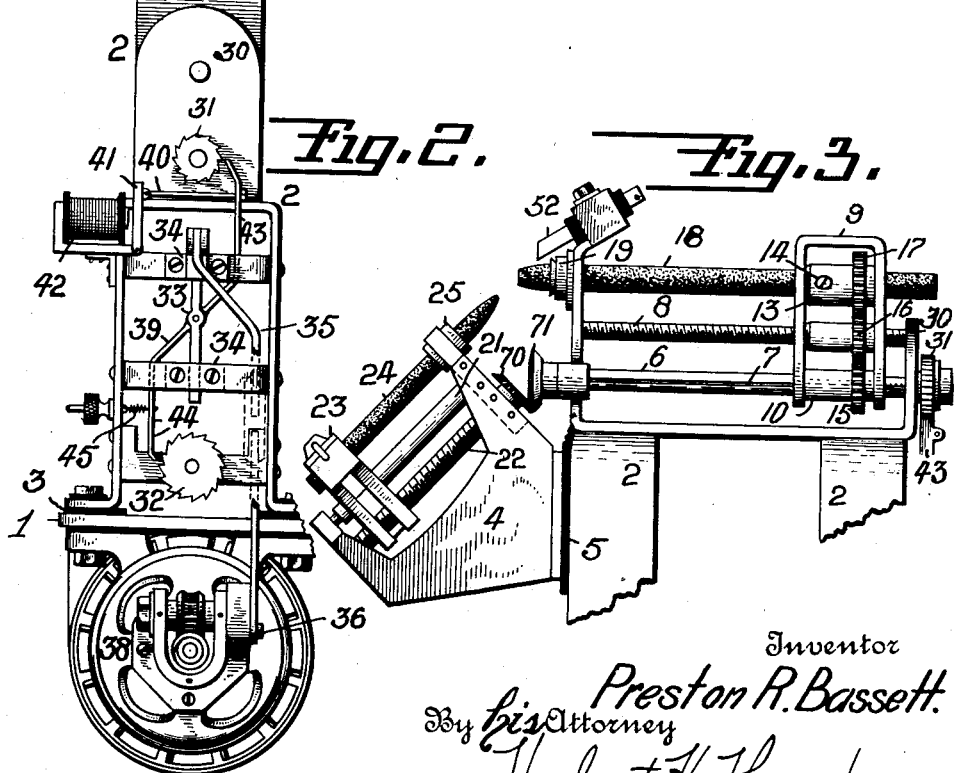
Inventor
Preston R. Bassett
By his Attorney
Herbert H. Thompson Jan. 15, 1929.  
P. R. BASSETT  
1,699,509  
CONTROL OF ARC LIGHTS  
Filed May 24, 1922  2 Sheets-Sheet 2
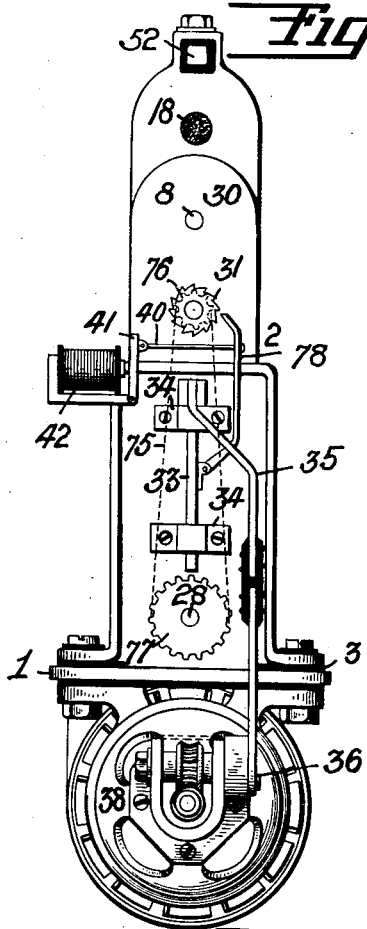
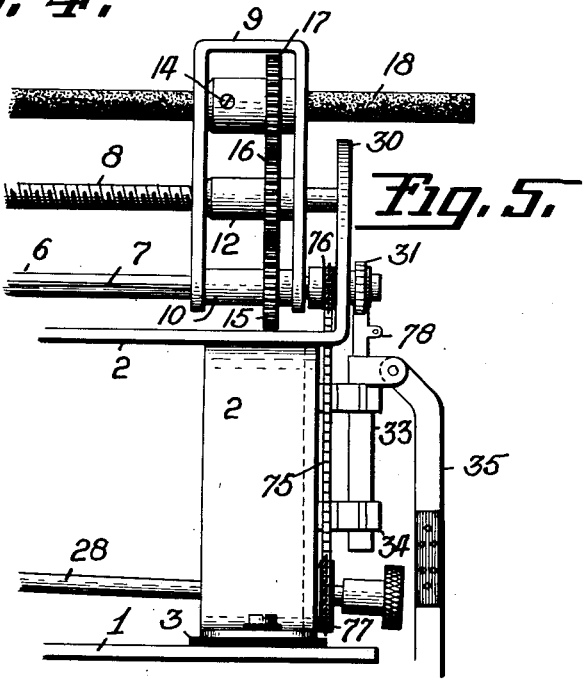
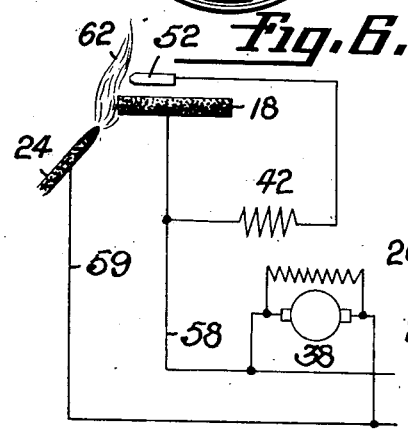
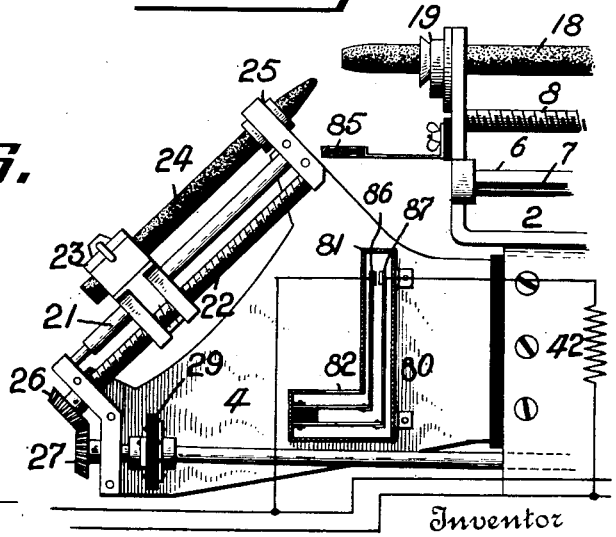
Inventor  
Preston R. Bassett.  
By his Attorney  
Herbert H. Thompson Patented Jan. 15, 1929.

1,699,509

UNITED STATES PATENT OFFICE.

PRESTON R. BASSETT, OF BROOKLYN, NEW YORK, ASSIGNOR TO THE SPERRY GYROSCOPE COMPANY, OF BROOKLYN, NEW YORK, A CORPORATION OF NEW YORK.

CONTROL OF ARC LIGHTS.

Application filed May 24, 1922. Serial No. 563,365.

This invention relates to arc lamps and has for its object the provision of means whereby the feeding mechanism for one electrode feeds also the other electrode in the same operation. In my copending application, Serial No. 258,255, filed October 15, 1918, I disclose a novel means of controlling the feed of one electrode of an arc lamp for projectors, the other electrode being fed by the old voltage control method. By means of my present invention on the other hand, it is necessary to provide feed mechanism responsive to variations in position of but one of the electrodes, and the arc length will be maintained constant by the feeding of both electrodes.

A further object of the invention is to simplify the structure and reduce the cost while increasing the reliability and efficiency of feeding mechanisms for projector uses.

Other objects and advantages will hereinafter appear.

Referring to the drawings where I have shown what I now consider to be the preferred forms of my invention, Fig. 1 is a side elevation of a lamp embodying one form of my invention.

Fig. 2 is a rear view of the lamp shown in Fig. 1.

Fig. 3 is a side elevation of a lamp embodying a second form of my invention.

Fig. 4 is a rear view of a lamp embodying a third form of my invention.

Fig. 5 is a side elevation of a portion of the lamp shown in Fig. 4.

Fig. 6 is a wiring diagram.

Fig. 7 is a side view of a portion of a lamp embodying a thermostatic control for the feed mechanism.

The type of lamp selected for illustrating the invention is a high intensity projector lamp especially adapted to fit in the projection housing (not shown) of a motion picture projection machine.

Referring to Figs. 1 and 2, a lamp base 1 has mounted thereon the main or rear portion 2 of the lamp frame, insulated from the base by insulation 3. The forward portion 4 of the frame may be secured to the rear portion and insulated therefrom as at 5. The rear portion of the frame may be provided with a rotatable rod 6 having a slot or groove 7, and a fixed threaded rod 8. Slidably mounted on said rods is a carriage 9. Rotatably mounted in said carriage and slidable upon rod 6 is a member 10, having a projection extending into the slot 7. Also rotatably mounted in the carriage is a nut member 12 in threaded engagement with rod 8. A third member 13 comprising an electrode holder is rotatably mounted in the carriage and may have a set screw 14 for securing the electrode. These three members may be provided with gears 15, 16, 17 successively inter-meshing. Thus, rotation of rod 6 will by reason of the projection on member 10 engaging in slot 7, cause the member 10 to rotate. The gears will in turn cause members 12 and 13 to rotate also, and the rotation of the nut member 12 will cause the entire carriage to advance along rod 8, while the rotation of the electrode-holding member 13 will cause rotation of the positive electrode 18, so that the electrode will be fed and rotated simultaneously. The forward end of the electrode 18 is shown as projecting through a guide 19 carried by the frame 2. This guide may also serve as a brush for the transmission of current from the frame to the electrode. Also, the carriage 9 may have a resilient brush 20 having sliding engagement with frame 2 to insure good electrical contact between the frame and the carriage, the current passing from the carriage through the electrode holder 13 to the electrode.

The forward portion 4 of the frame carries a fixed guide rod 21 and a rotatable threaded rod 22, upon which rod is mounted a carriage 23 having threaded engagement with the rod 22. This carriage is adapted to grip the negative electrode 24 as indicated. The forward end of the electrode may pass through a brush or guide 25 on the frame 4. The lower end of rod 22 may be provided with a bevel gear 26 meshing with a second bevel gear 27 on a rod 28, the said rod 28 being divided into two parts by an insulating coupling 29.

Rods 6 and 28 are shown as projecting beyond the rear end 30 of frame 2 (see also Fig. 2), and are provided with ratchet gears 31, 32, fixed thereon.

Mounted on the back of frame 2 is a carriage 33 adapted for reciprocatory up and down movement in bearings 34. Pivotally attached to said carriage is a rod 35 reaching downward and having an eccentric connection at 36 with the shaft of an electric motor 38.

On the reciprocatory carriage 33 is a pawl member 39 connected by a link 40 to the armature 41 of an electromagnet 42. Said pawl member comprises a pawl 43 at its upper end and a pawl 44 at its lower end, said pawls cooperating with the ratchets 31 and 32, respectively. Said pawls are normally out of engagement with their ratchets, but are brought into engagement therewith by energization of magnet 42 which draws upon link 40 to rotate pawl member 39, so that the reciprocatory movement of carriage 33 will cause the ratchets 31 and 32 to be rotated alternately. The rotation of pawl member 39 is against the action of a restoring spring 45 which may be fixed at one end to one arm of the pawl member and at the other end to the fixed frame.

For energizing the magnet, I provide some means which is responsive to the position of the principal light source, which in the high intensity arc lies adjacent the crater of the positive electrode. In one of said means there is mounted on frame 2, preferably above the positive electrode and adjacent the arcing end thereof, an auxiliary or third electrode 52 insulated from the frame 2. This electrode forms a terminal of an electric shunt circuit which includes the electromagnet 42 and the arc flame 62. The motor 38 is shown connected across the main lead lines 58 and 59 and operates continuously to reciprocate carriage 33 and the pawl member 39 carried thereby. The arc flame 62 normally sweeps upwardly between the electrodes adjacent the terminal 52, but out of engagement therewith when tip 63 of the positive electrode 18 is in the proper position. As this tip burns back and the flame follows, the latter will engage terminal 52 and close the shunt circuit from lead line 58 to electromagnet 42, terminal 52, arc flame 62 to electrode 24 and lead line 59. The current-conducting properties of the flame gases will cause the circuit through magnet 42 to be closed. Armature 41 will now be attracted to rotate pawl member 39 about its pivot 33 to bring pawls 43 and 44 into engagement with the respective ratchets. The reciprocating carriage 33 will cause the pawls to engage their respective ratchets alternately to rotate both shaft 6 and shaft 28 and hence, operate both carriage 9 and carriage 23 to feed the positive and negative electrodes. When tip 63 has been fed away from terminal 52 a sufficient distance to break the circuit through the magnet 42, feeding of both electrodes will stop.

Another means controlled by the principal light source for energizing magnet 42 to operate the feeding mechanism is illustrated in Fig. 7. Said means comprises a thermostat 80 mounted in a casing 81 having an opening 82 therein. Said opening is so positioned that when the positive electrode is in its proper position the light therefrom, concentrated by a lens 85 will pass through opening 82 and heat the thermostat. The thermostatic elements are so selected that when heated they tend to keep spaced apart contacts 86 and 87 connected to the elements. When the positive carbon burns away from its proper feeding position, the light therefrom will no longer be concentrated by the lens to pass through opening 82, and as a consequence the thermostat will cool to permit contacts 86 and 87 to close a shunt circuit through magnet 42. Thereafter the feeding mechanism is operated as hereinbefore described until the positive carbon is fed to proper position when the light will again be focused upon the thermostat to open the circuit. It will be understood that the thermostat may be arranged so that the light normally does not strike thereon, but as the positive burns away from proper position the light passes through opening 82 to effect engagement between contacts 86 and 87 to close the circuit. In this case the thermostatic elements would be so selected that when cool they tend to maintain the contacts spaced apart, but when heated, cause engagement of said contacts.

Since the positive electrode burns away more rapidly than the negative electrode, the gearing between the pawl-member 39 and the respective feeding mechanisms may be correspondingly proportioned. In the present instance, ratchet 32 of the negative electrode feed mechanism is larger than ratchet 31 of the positive electrode feed mechanism, so that for equal movements of the pawl member above and below its normal position, there will be a greater angular movement of ratchet 31 than of ratchet 32, resulting in a greater feeding movement of the positive electrode. The usual ratio is substantially two to one. The same result could be accomplished by suitably proportioning gears 26 and 27 or the pitch of the threads on screws 8 and 22, instead of proportioning the ratchets 31 and 32.

The principle of feeding both electrodes in the same operation by means responsive to variations in the position of one electrode may be variously applied. Thus in Fig. 3, only one pawl 43 is employed, meshing with ratchet 31 to rotate shaft 6. Instead of a second pawl 44, ratchet 32, shaft 28, and gears 26 and 27, the screw 22 is driven directly from shaft 6 by means of a gear 70 on the inner end of said screw meshing with a gear 71 on the inner end of shaft 6.

Still another embodiment of my invention is illustrated in Figs. 4 and 5, which is similar to the modification shown in Figs. 1 and 2 with the exception that the pawl 44 and ratchet 32 are replaced by a chain 75 passing over sprockets 76 and 77 on the shafts 6 and 28, respectively. A single pawl 78 on the carriage 33 engages the ratchet 31 to drive shaft 6. In the modifications of Figs. 3, 4 and 5, therefore, there is only one driven shaft, here shown as shaft 6, while the other shaft is operated from the driven shaft by suitable gearing.

In all of the modifications described above, the gearing between the positive electrode-driving mechanism and the negative electrode-driving mechanism is such as to feed the positive electrode substantially twice as fast as the negative, although it will be understood that the invention applies where any other ratio is maintained. Ordinarily, considerable variations occur in the rate of burning of the positive electrode, due probably to variations in its composition. By the present invention such variations in the rate of burning would cause faster or slower feeding of both the positive and the negative electrodes, which would thus shorten or lengthen the arc. But since the arc end of the positive electrode is maintained in constant position, only the negative electrode varies, and since the latter travels only one-half as fast as the positive electrode, these variations in the length of the arc will be cut in half. The feeding of both electrodes in the same operation and maintaining the arc end of the positive electrode in constant position, thus results in an arc whose length is subject to smaller variations than would otherwise be the case.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention what I claim and desire to secure by Letters Patent is, 1. In an arc lamp adapted to employ a pair of electrodes, a feeding mechanism for each of said electrodes and for rotating at least one of said electrodes, said mechanisms being normally ineffective, and means responsive to variations in the position of one of said electrodes for rendering both of said mechanisms effective simultaneously to rotate at least one electrode and feed both.

2. In an arc lamp adapted to employ a pair of electrodes, a feeding mechanism for each of said electrodes, each of said mechanisms including a ratchet, a common operating member normally out of engagement with said ratchets, and means responsive to variations in the position of one of said electrodes for moving said operating member into engagement with said ratchets.

3. In an arc lamp, a relatively slow-burning electrode, a relatively rapid-burning electrode, means for feeding both of said electrodes in the same operation and proportionate to their rate of burning, and means for maintaining the arc end of the rapid-burning electrode in constant position.

4. In an arc lamp, a relatively slow-burning negative electrode, a relatively rapid-burning positive electrode, means for feeding both of said electrodes in the same operation and proportionate to their rate of burning, and means for maintaining the arc end of the positive electrode in constant position.

5. In an arc lamp adapted to employ a pair of electrodes, a feeding mechanism for each of said electrodes, and means responsive to variations in the position of one of said electrodes whereby both of said electrodes are fed in the same operation by repeated, alternate actuations of said mechanisms.

6. In an arc lamp adapted to employ a pair of electrodes, a feeding mechanism for each of said electrodes, each of said mechanisms including a ratchet, a common operating member normally out of engagement with said ratchets, means responsive to variations in the position of one of said electrodes for moving said operating member into engagement with said ratchets and means for actuating said operating member to operate said ratchets alternately to feed both electrodes in the same operation.

7. In an arc lamp adapted to employ a pair of electrodes, a feeding mechanism for each of said electrodes, a single operating member for said mechanisms, and means for reciproating said member, said member being so positioned as to engage said mechanisms alternately during each reciprocation thereof.

8. In an arc lamp adapted to employ a pair of electrodes, a feeding mechanism for each of said electrodes, a single operating member for said mechanisms, means for continuously reciprocating said member, said member being normally ineffective to operate said mechanisms, and means controlled by the position of one of said electrodes for rendering said member effective to engage said mechanisms alternately during each reciprocation thereof.

In testimony whereof I have affixed my signature.

PRESTON R. BASSETT.